(12) United States Patent
Hu et al.

(10) Patent No.: US 11,010,888 B2
(45) Date of Patent: May 18, 2021

(54) PRECISION DEFECT DETECTION BASED ON IMAGE DIFFERENCE WITH RESPECT TO TEMPLATES

(71) Applicant: INTERNATIONAL BUSINESS MACHINES CORPORATION, Armonk, NY (US)

(72) Inventors: Guo Qiang Hu, Shanghai (CN); Jun Zhu, Shanghai (CN); Peng Ji, Nanjing (CN); Jing Chang Huang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 206 days.

(21) Appl. No.: 16/173,682

(22) Filed: Oct. 29, 2018

(65) Prior Publication Data
US 2020/0134800 A1 Apr. 30, 2020

(51) Int. Cl.
*G06T 7/00* (2017.01)
*G06T 11/60* (2006.01)
*G06K 9/62* (2006.01)

(52) U.S. Cl.
CPC ............ *G06T 7/001* (2013.01); *G06K 9/6202* (2013.01); *G06T 11/60* (2013.01); *G06T 2207/20081* (2013.01); *G06T 2207/20084* (2013.01)

(58) Field of Classification Search
CPC ......... G06T 7/001; G06T 11/60; G06T 11/00; G06T 2207/20081; G06T 2207/20084; G06K 9/6202
See application file for complete search history.

(56) References Cited

U.S. PATENT DOCUMENTS 5,640,200 A * 6/1997 Michael .................. G06T 7/001
348/126
8,782,611 B1 7/2014 Kretzler et al.
(Continued)

FOREIGN PATENT DOCUMENTS

CN 106952257 7/2017
JP 2014126445 7/2014

OTHER PUBLICATIONS

Liu et al., "Hybrid CPU-GPU Scheduling and Execution of Tree Traversals", ICS '16, Jun. 2016, 12 pages.
(Continued)

*Primary Examiner* — Syed Haider
(74) *Attorney, Agent, or Firm* — Tutunjian & Bitetto, P.C.; Joseph Petrokaitis

(57) ABSTRACT

A computer-implemented method is provided for image-based defect detection. The method includes performing, by a processor device, template matching and subtraction on a set of training images and at least one template image to obtain a set of difference images. The difference images have defects, if any, highlighted therein. The method further includes generating, by the hardware processor applying a binary classification model to each of the training images in the set, activation heatmaps. The method also includes identifying, by the hardware processor, rough defect areas of interest in the activation heatmaps. The method additionally includes super-imposing, by the hardware processor, the activation heatmaps onto the difference images to obtain a set of super-imposed images, and highlight, as true defect areas, any areas in the super-imposed images having the defects from the difference images that overlap with the rough defect areas of interest from the activation heatmaps.

20 Claims, 7 Drawing Sheets

(56) References Cited

U.S. PATENT DOCUMENTS

| | | | |
|---|---|---|---|
| 9,733,200 B2 | 8/2017 | Sugimoto et al. | |
| 10,706,321 B1* | 7/2020 | Chen | G06T 3/4007 |
| 2001/0012395 A1* | 8/2001 | Michael | G06T 7/001 |
| | | | 382/152 |
| 2011/0022817 A1 | 1/2011 | Gaster et al. | |
| 2012/0027288 A1 | 2/2012 | Yuan et al. | |
| 2012/0128237 A1* | 5/2012 | Wang | G06K 9/468 |
| | | | 382/159 |
| 2013/0002689 A1 | 1/2013 | Panneer et al. | |
| 2013/0308875 A1* | 11/2013 | Jacobson | G06K 9/3216 |
| | | | 382/284 |
| 2015/0057952 A1 | 2/2015 | Coombs et al. | |

OTHER PUBLICATIONS

Xie et al., "A Physics-Based Defects Model and Inspection Algorithm for Automatic Visual Inspection", Optics and Lasers in Engineering 2014, Feb. 2014, pp. 218-223.

Zintgraf et al., "Visualizing Deep Neural Network Decisions: Prediction Difference Analysis", Published as a conference paper at ICLR 2017, arXiv:1702.04595v1 [cs.CV] Feb. 15, 2017, pp. 1-12.

* cited by examiner

PRECISION DEFECT DETECTION BASED ON IMAGE DIFFERENCE WITH RESPECT TO TEMPLATES

BACKGROUND

Technical Field

The present invention generally relates to defect detection, and more particularly to precision defect detection based on image difference with respect to templates.

Description of the Related Art

Often, in defect detection in manufacturing scenarios, there is a relatively small defect area in a large picture. Accordingly, the defect needs to be detected and extracted first for accurate classification. Accurate position determining for a defect can also often determine the severity of the defect and has an impact on the subsequent processing flow (e.g., repair, rework, ignore, disposal, etc.).

In many defect detection applications in the manufacturing industry, standard reference templates are available for comparison to inspection images in order to detect defects. However, the performance of current defect location detection systems are sensitive to noise, change of illumination, small image deformations (e.g., due to different camera calibrations, etc.), and so forth. Moreover, while traditional template matching based approaches are able detect actual defect areas, they are prone to many false alarms. State-of-art object detection or image segmentation approaches based on deep learning require expensive labeling of defect locations and are thus difficult to efficiently apply in production. Hence, there is a need for an precise template-based defect detection approach.

SUMMARY

According to an aspect of the present invention, a computer-implemented method is provided for image-based defect detection. The method includes performing, by a processor device, template matching and subtraction on a set of training images and at least one template image to obtain a set of difference images. The difference images have defects, if any, highlighted therein. The method further includes generating, by the hardware processor applying a binary classification model to each of the training images in the set, activation heatmaps. The method also includes identifying, by the hardware processor, rough defect areas of interest in the activation heatmaps. The method additionally includes super-imposing, by the hardware processor, the activation heatmaps onto the difference images to obtain a set of super-imposed images, and highlight, as true defect areas, any areas in the super-imposed images having the defects from the difference images that overlap with the rough defect areas of interest from the activation heatmaps.

According to another aspect of the present invention, a computer program product is provided for image-based defect detection. The computer program product includes a non-transitory computer readable storage medium having program instructions embodied therewith. The program instructions are executable by a computer to cause the computer to perform a method. The method includes performing, by a processor device, template matching and subtraction on a set of training images and at least one template image to obtain a set of difference images. The difference images have defects, if any, highlighted therein. The method further includes generating, by the hardware processor applying a binary classification model to each of the training images in the set, activation heatmaps. The method also includes identifying, by the hardware processor, rough defect areas of interest in the activation heatmaps. The method additionally includes super-imposing, by the hardware processor, the activation heatmaps onto the difference images to obtain a set of super-imposed images, and highlight, as true defect areas, any areas in the super-imposed images having the defects from the difference images that overlap with the rough defect areas of interest from the activation heatmaps.

According to yet another aspect of the present invention, a computer processing system is provided for image-based defect detection. The computer processing system includes a memory for storing program code. The computer processing system further includes a processor device for running the program code to perform template matching and subtraction on a set of training images and at least one template image to obtain a set of difference images. The difference images have defects, if any, highlighted therein. The processor device further runs the program code to generate, by applying a binary classification model to each of the training images in the set, activation heatmaps. The processor device also runs the program code to identify rough defect areas of interest in the activation heatmaps. The processor device additionally runs the program code to super-imposing the activation heatmaps onto the difference images to obtain a set of super-imposed images, and highlight, as true defect areas, any areas in the super-imposed images having the defects from the difference images that overlap with the rough defect areas of interest from the activation heatmaps.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to defect detection based on image difference with respect to templates.

In an embodiment, an accurate defect detection system is provided which includes the following features:

(1) Channel concatenation of the aligned inspection image and template image as an input to a defect detection or a defect segmentation model.

(2) The use of template matching and subtraction to obtain a difference image with potential defect areas that can be used as training images.

(3) The use of merely class-labeled training images to train a classification model and obtain the activation heatmap for each training image classified as "defective".

(4) The use of a heatmap to screen out false defect areas in the difference image and mark the overlapped defect area as a final defect area. In this way, an accurate defect area is obtained for a training image.

(5) The use of training images to train the aforementioned defect detection or defect segmentation model.

One of the many advantages of the present invention relates to the fully automatic generation of accurate defect locations for merely class-labeled training images. The preceding provides a significant savings with respect to location labeling that is needed in standard object detection/image segmentation tasks. In an embodiment, the present invention performs accurate location detection via the channel concatenation from aligned inspection/template images.

Figure 1:
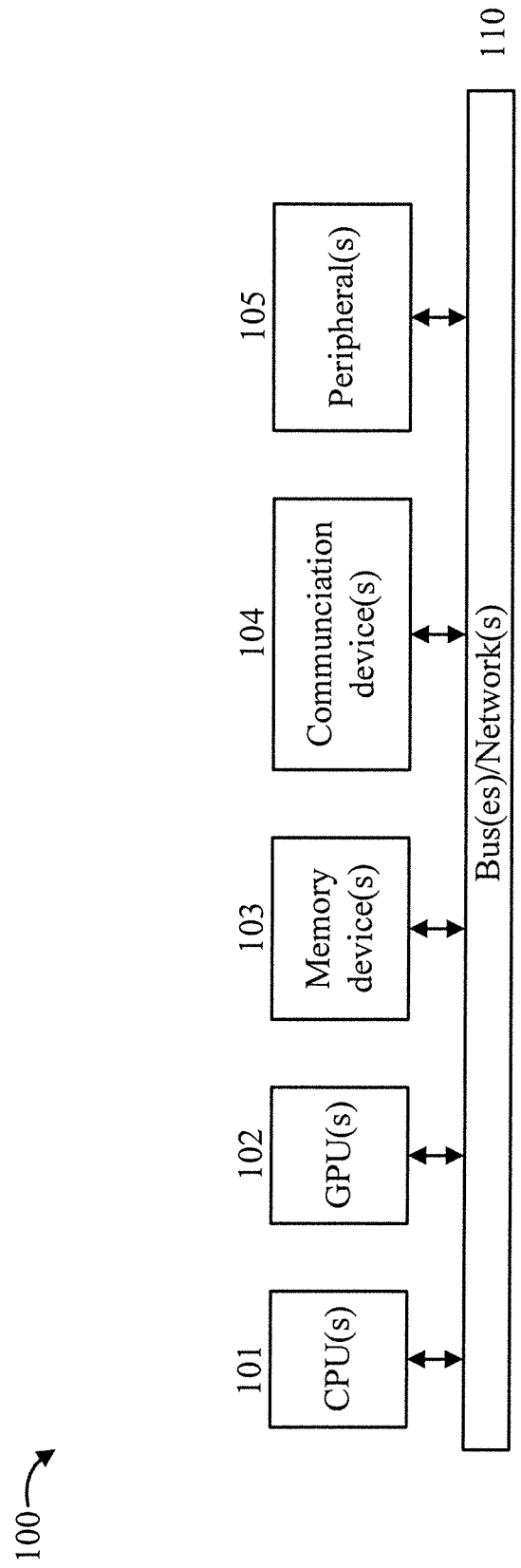
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

A description will now be given regarding two exemplary environments 200 and 300 to which the present invention can be applied, in accordance with various embodiments of the present invention. The environments 200 and 300 are described below with respect to FIGS. 2 and 3, respectively. In further detail, the environment 200 includes defect detection system operatively coupled to a controlled system, while the environment 300 includes a defect detection system as part of a controlled system. Moreover, any of environments 200 and 300 can be part of a cloud-based environment (e.g., see FIGS. 6 and 7). These and other environments to which the present invention can be applied are readily determined by one of ordinary skill in the art, given the teachings of the present invention provided herein, while maintaining the spirit of the present invention.

Figure 2:
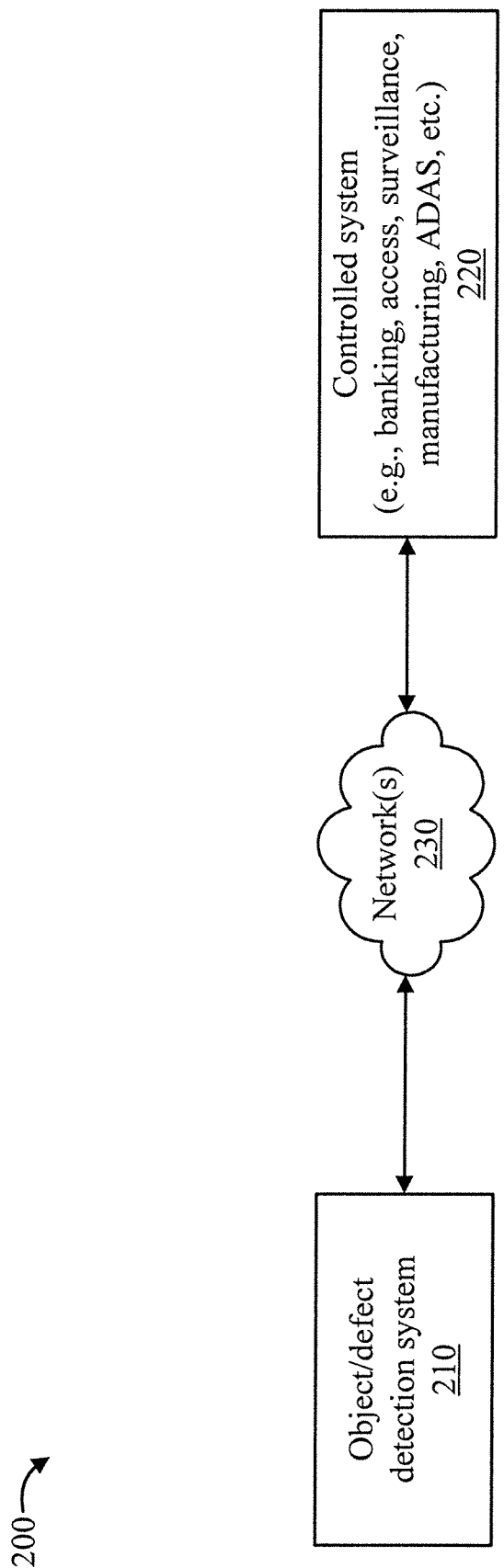
FIG. 2 is a block diagram showing an exemplary environment to which the present invention can be applied, in accordance with an embodiment of the present invention.

FIG. 2 is a block diagram showing an exemplary environment 200 to which the present invention can be applied, in accordance with an embodiment of the present invention.

The environment 200 includes an object/defect detection system 210 and a controlled system 220. Hence, system 210 is selectively configurable to perform object detection and/or defect detection (where the defect is the object being detected). The object/defect detection system 210 and the controlled system 220 are configured to enable communications therebetween. For example, transceivers and/or other types of communication devices including wireless, wired, and combinations thereof can be used. In an embodiment, communication between the object/defect detection system 210 and the controlled system 220 can be performed over one or more networks, collectively denoted by the figure reference numeral 230. The communication can include, but is not limited to, inspection images (and possible template images as well) from the controlled system 220, and defect detection results and action initiation control signals from the object/defect detection system 210. The controlled system 220 can be any type of processor-based system such as, for example, but not limited to, a surveillance system, a manufacturing system (e.g., an assembly line), an Advanced Driver-Assistance System (ADAS), and so forth.

The controlled system 220 provides images to the object/defect detection system 210 which can use the images to determinations regarding defects and perform certain actions in response thereto.

The controlled system 220 can be controlled based on a detection result from the object/defect detection system 210. For example, based on result that an integrated circuit is defective, the integrated circuit may be discarded, while a lack of such result, the integrated circuit may be further processed. As another example, based on a scenario involving object detection, one or more actions directed to avoiding contact with a detected object can be performed such as braking, steering, and/or accelerating. As yet another example, based on a detecting an intruder, a surveillance system being controlled could lock or unlock one or more doors in order to secure someone in a certain place (holding area) and/or guide them to a safe place (safe room) and/or restrict them from a restricted place and/or so forth. It is to be appreciated that the preceding actions are merely illustrative and, thus, other actions can also be performed depending upon the implementation, as readily appreciated by one of ordinary skill in the art given the teachings of the present invention provided herein, while maintaining the spirit of the present invention.

In an embodiment, the object/defect detection system 210 can be implemented as a node in a cloud-computing arrangement. In an embodiment, a single object/defect detection system 210 can be assigned to a single controlled system or to multiple controlled systems e.g., different robots in an assembly line, and so forth). These and other configurations of the elements of environment 200 are readily determined by one of ordinary skill in the art given the teachings of the present invention provided herein, while maintaining the spirit of the present invention.

Figure 3:
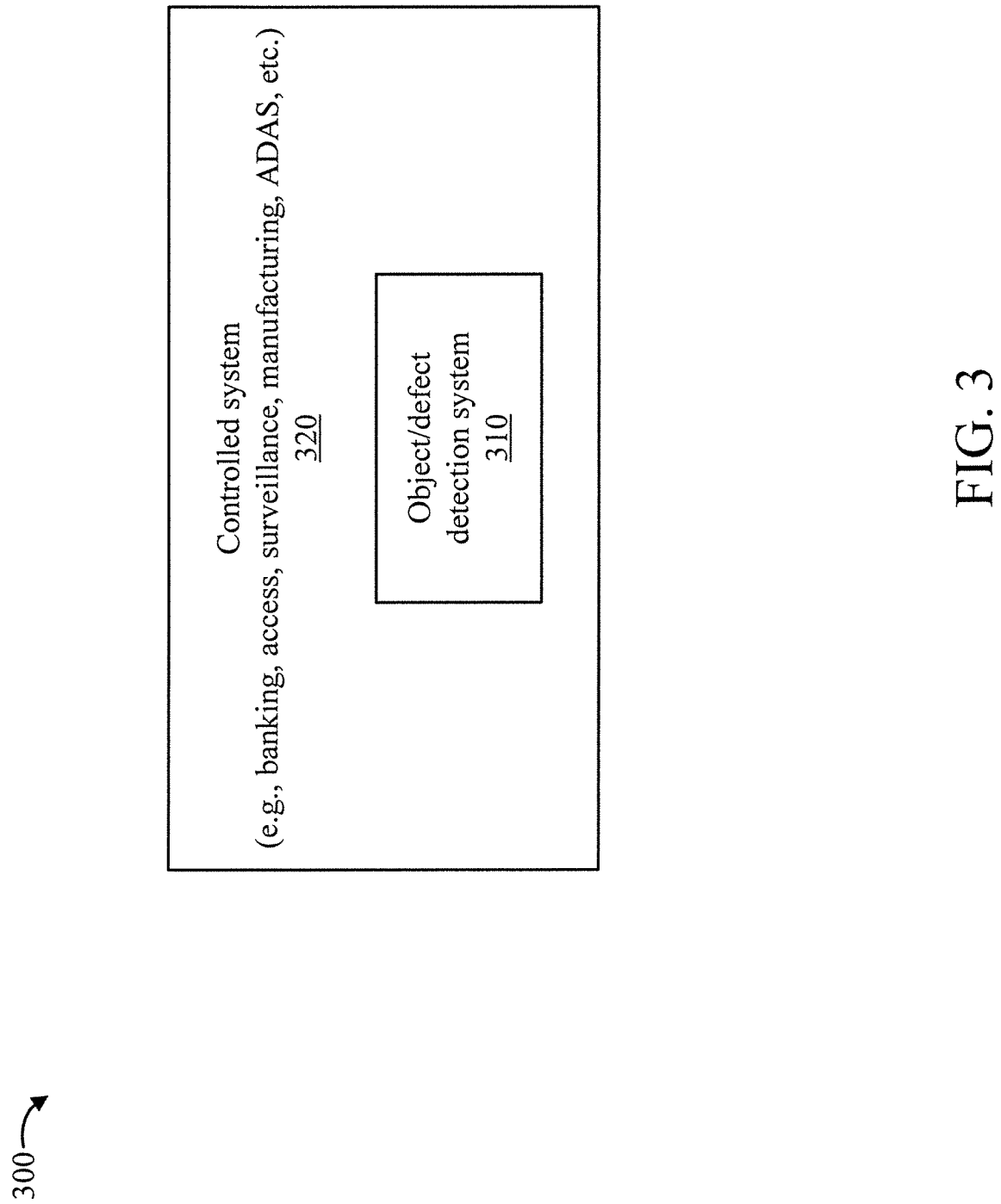
FIG. 3 is a block diagram showing another exemplary environment to which the present invention can be applied, in accordance with an embodiment of the present invention.

FIG. 3 is a block diagram showing another exemplary environment 300 to which the present invention can be applied, in accordance with an embodiment of the present invention.

The environment 300 includes a controlled system 320 that, in turn, includes an object/defect detection system 310. One or more communication buses and/or other devices can be used to facilitate inter-system, as well as intra-system, communication. The controlled system 320 can be any type of processor-based system such as, for example, but not limited to a surveillance system, a manufacturing system (e.g., an assembly line), an Advanced Driver-Assistance System (ADAS), and so forth.

Other than system 310 being included in system 320, operations of these elements in environments 200 and 300 are similar. Accordingly, elements 310 and 320 are not described in further detail relative to FIG. 3 for the sake of brevity, with the reader respectively directed to the descriptions of elements 210 and 220 relative to environment 200 of FIG. 2 given the common functions of these elements in the two environments 200 and 300.

It has been noted that classification deep learning tasks usually have much lower labeling efforts in comparison to object detection and image segmentation. It has been further noted that deep learning result interpretation reveals activation heatmaps that are able to illuminate rough relevant areas in the input image that most intensively affect the corresponding classification results. Accordingly, the present invention exploits the opportunity to leverage such rough areas of interest for defect detection/segmentation applications.

In a convolutional neural network, the activation heatmap is generated over the output (called feature maps) of the last convolutional layer. The feature maps can be regarded as a transformed image representation of the original input image, with however smaller size. Thus, the ROI area marked via the heatmap is of low resolution. The ROI area can be resized to fit the original image size but the area remains a rough location of the defect. How "rough" the marking is depends on the resolution gap between the original input image and the feature maps of the last convolutional layer, which varies case by case in the application of the CNN. Hence, the term "rough" refers to a resolution gap between the input image and the feature map from which the heatmap is generated, as the heatmap has the same resolution as the feature map from which the heatmap is generated and which is less than the original input image.

Various methods are hereinafter described with respect to FIGS. 4 and 5. These methods can be performed by computer processing system 100 and/or by the object/defect detection system 210 of FIG. 2 and/or by the object/defect detection system 310 of FIG. 3.

Figure 4:
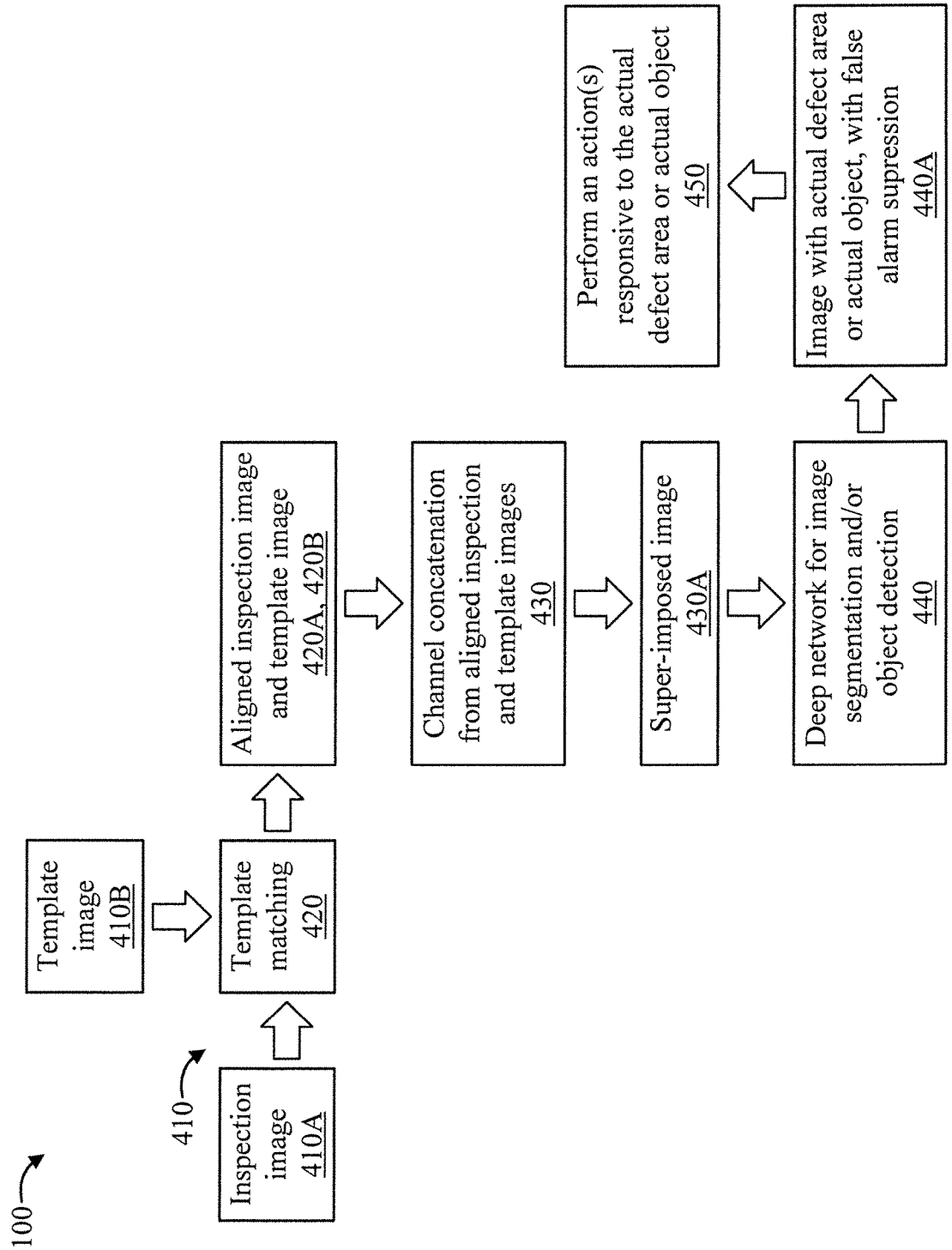
FIG. 4 is a high-level block/flow diagram showing an exemplary inference model, in accordance with an embodiment of the present invention.

FIG. 4 is a high-level block/flow diagram showing an exemplary inference model 400, in accordance with an embodiment of the present invention.

At block 410, receive an inspection image 410A and a template image 410B.

At block 420, perform template matching on the inspection image 410A and the template image 410B to output aligned inspection 420A and template images 420B. That is, the inspect image 420A and the template image 420B that are output from the template matching are in alignment with respect to each other. In the prior art, these two aligned images would then be subjected to a subtraction operation that is prone to the problem of having false alarms. This problem is overcome by the following steps of the present invention.

At block 430, perform channel concatenation with respect to the aligned inspection 420A and template images 420B to obtain a super-imposed image 430A. The super-imposed image 430A is a single image with six channels. The six channels consists of 3 channels for each the two RGB (Red, Green, Blue) images that form the super-imposed image 430A.

At block 440, apply a deep network for image segmentation and/or object detection to the super-imposed image 430A to obtain a resultant image 440A that includes an actual defect area or an actual object and that is obtained with false alarm suppression.

At block 450, perform an action(s) responsive to the actual defect area or the actual object in the resultant image. For example, in the case of a manufactured item (e.g., integrated circuit, chip, etc.) and a scenario involving defect identification, the item can be discarded in order to avoid the manufactured item being further processed (e.g., further manufactured, packaged, shipped, etc.) for selling to a consumer. As another example, in the case of an object and a scenario involving object (e.g., a deer, another vehicle, a pedestrian, etc.) detection, one or more vehicle functions (e.g., braking, steering, accelerating) can be controlled to avoid contacting the detected object. It is to be appreciated that the preceding actions are merely illustrative and, thus, other actions can also be performed depending upon the implementation, while maintaining the spirit of the present invention.

The deep network is trained to segment out the real defect area and suppress false alarms by using training image that have classification labels (i.e., "good" versus "defect"), but without defect location labels.

Figure 5:
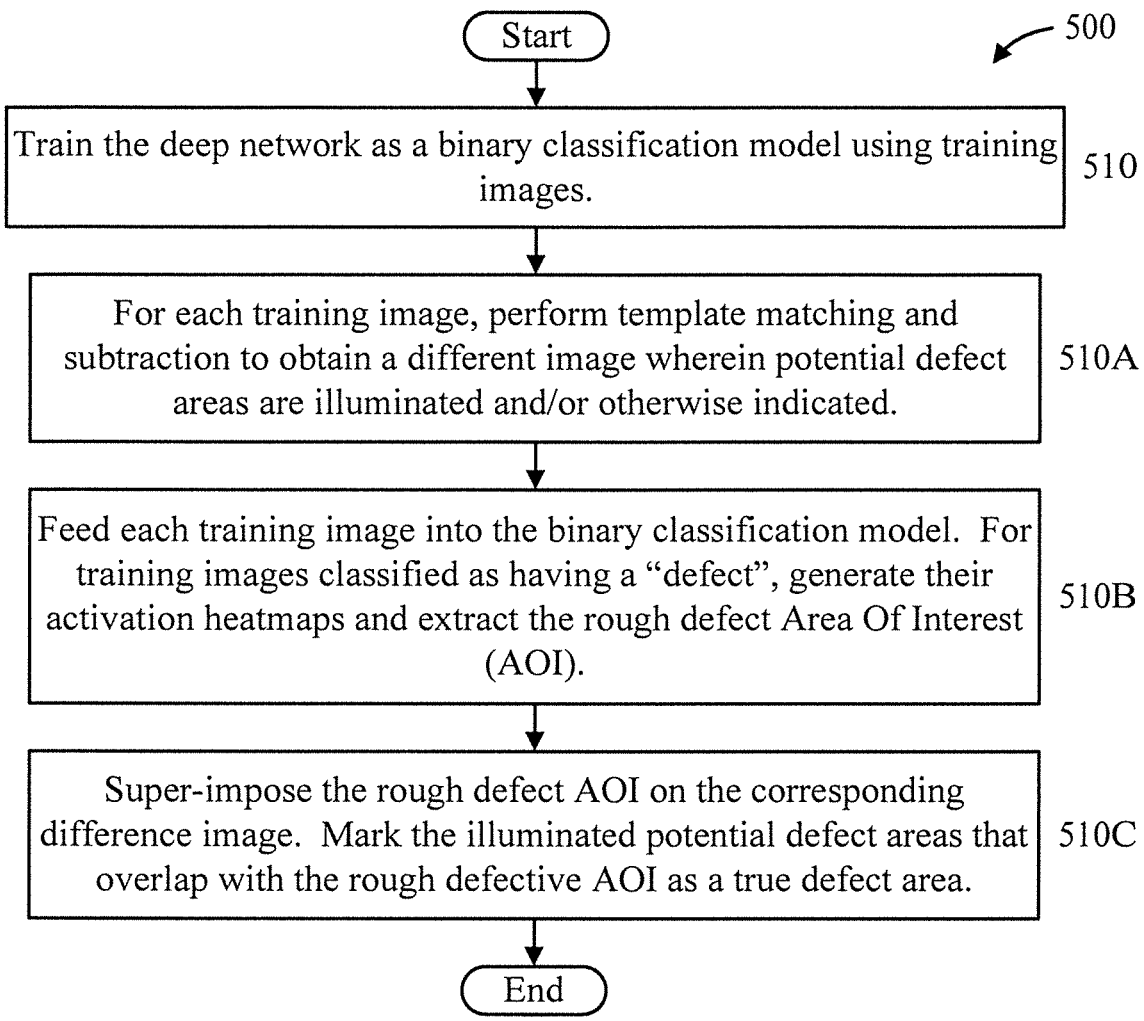
FIG. 5 is a block diagram showing an exemplary method for labeling of defect locations in images for training a deep network for image segmentation or object detection, in accordance with an embodiment of the present invention.

FIG. 5 is a block diagram showing an exemplary method 500 for labeling of defect locations in images for training a deep network for image segmentation or object detection, in accordance with an embodiment of the present invention.

At block 510, train the deep network as a binary classification model using training images.

In an embodiment, block 510 can include one or more of blocks 510A, 510B, and 510C.

At block 510A, for each training image, perform template matching and subtraction to obtain a different image wherein potential defect areas are illuminated and/or otherwise indicated.

At block 510B, feed each training image into the binary classification model. For training images classified as having a "defect", generate their activation heatmaps and extract the rough defect Area Of Interest (AOI). In an embodiment, a heatmap is not generated for images not classified as having a "defect".

At block 510C, super-impose the rough defect AOI on the corresponding difference image. Mark the illuminated potential defect areas that overlap with the rough defective AOI as a true defect area. In this way, the defect areas are literally marked.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
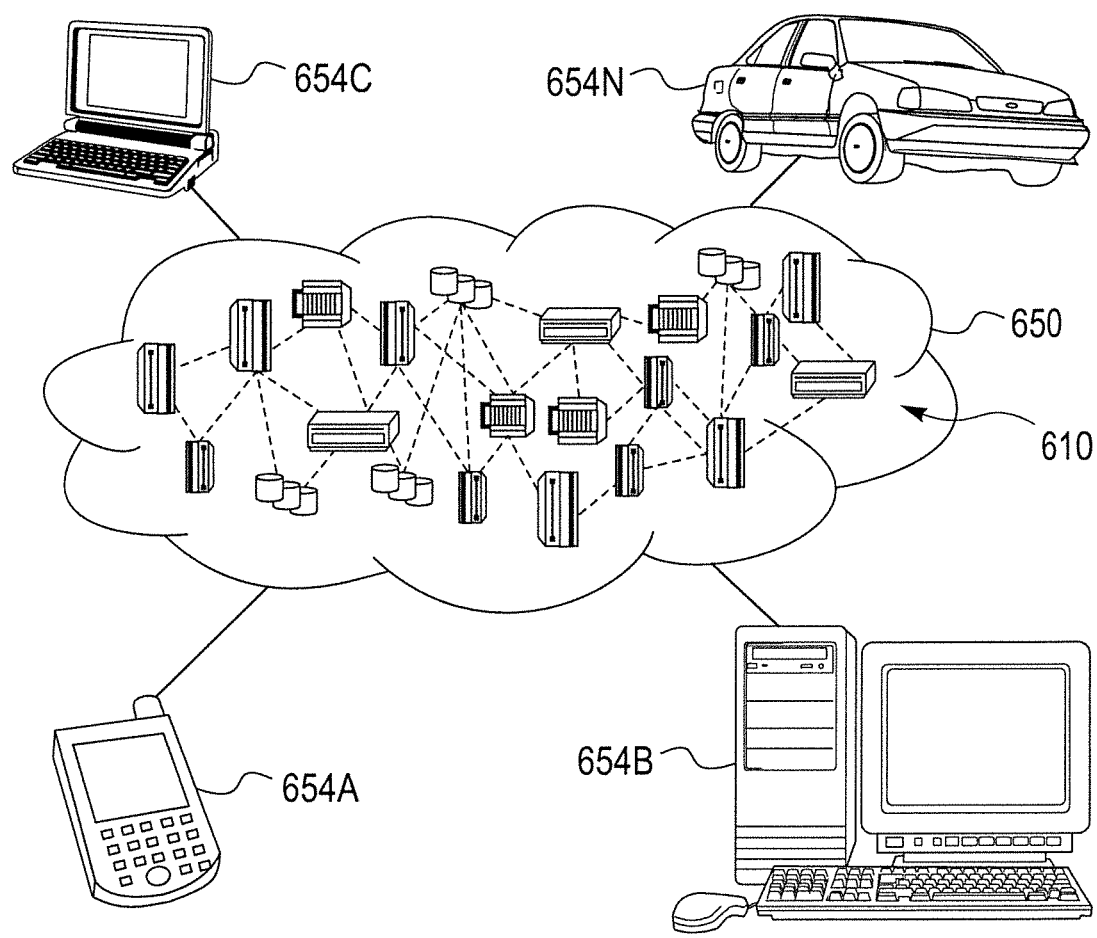
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
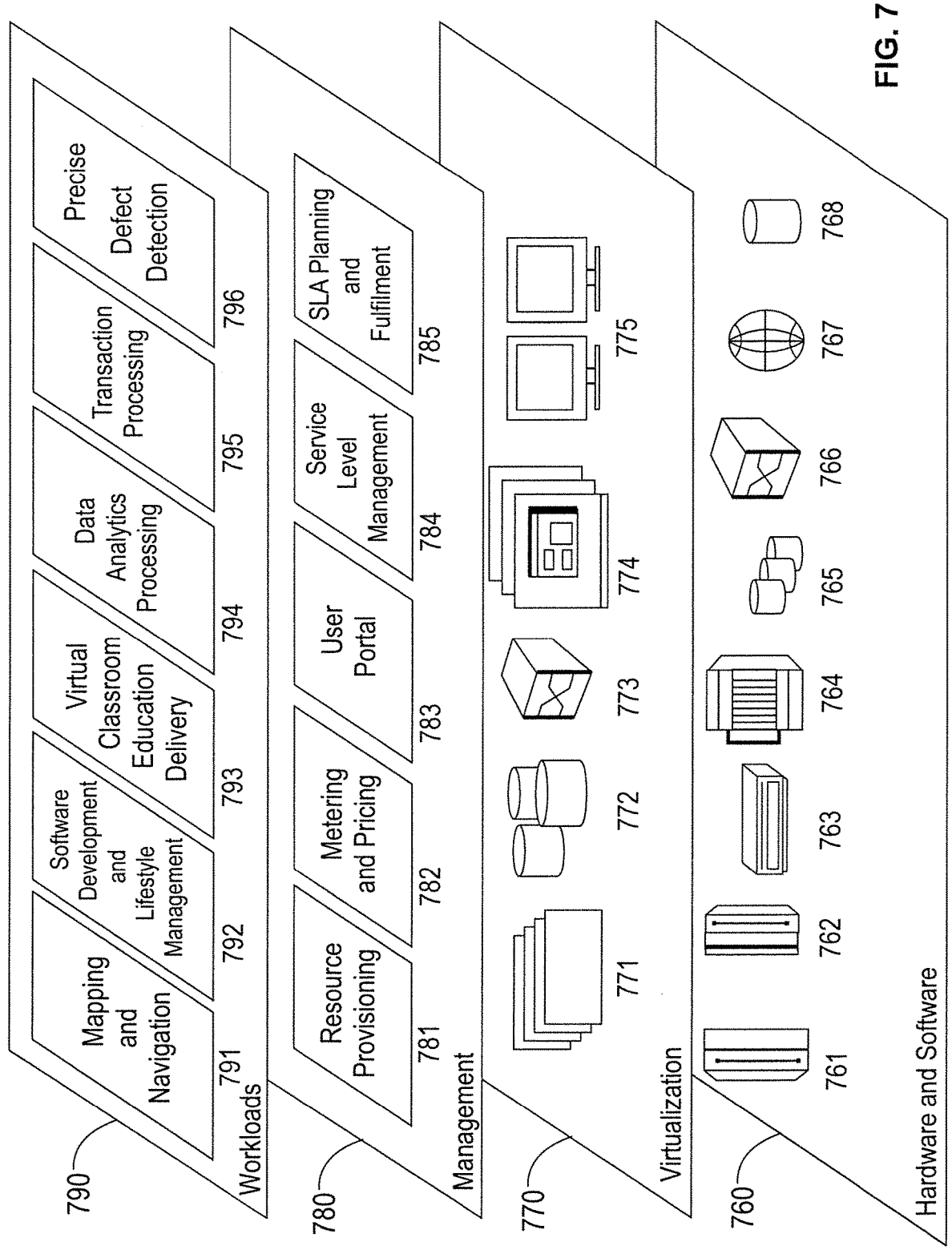
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and precise defect detection based on image different with respect to templates 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for image-based defect detection, comprising:
    performing, by a processor device, template matching and subtraction on a set of training images and at least one template image to obtain a set of difference images, the difference images having defects, if any, highlighted therein;
    generating, by the hardware processor applying a binary classification model to each of the training images in the set, activation heatmaps;
    identifying, by the hardware processor, rough defect areas of interest in the activation heatmaps; and
    super-imposing, by the hardware processor, the activation heatmaps onto the difference images to obtain a set of super-imposed images, and highlight, as true defect areas, any areas in the super-imposed images having the defects from the difference images that overlap with the rough defect areas of interest from the activation heatmaps.

2. The computer-implemented method of claim 1, wherein the set of training images include class-labels and lack location labels for any of the defects therein.

3. The computer-implemented method of claim 1, further comprising training a deep neural network for image segmentation using the set of training images.

4. The computer-implemented method of claim 3, further comprising:
    applying an inspection image of an object to the trained binary classification model in order to identify a defect area in the object; and
    discarding the object responsive to identifying the defect area.

5. The computer-implemented method of claim 1, further comprising training a deep neural network for object detection using the set of training images.

6. The computer-implemented method of claim 5, further comprising:
    applying an inspection image of an object to the trained binary classification model in order to identify the object; and
    automatically engaging one or more motor vehicle functions to avoid contacting the object.

7. The computer-implemented method of claim 1, wherein each of the super-imposed images consist of a respective single image having six channels, with three channels supplied from each of the constituent images forming the respective single image.

8. The computer-implemented method of claim 1, further comprising screening out false defect areas in the difference images based on the heatmaps.

9. The computer-implemented method of claim 1, wherein the false defect areas are detected in the difference images based on a lack of co-occurrence of a respective one of the rough defect areas of interest in a respective one of the heatmaps.

10. The computer-implemented method of claim 1, further comprising ignoring, as false positives, any of the defects from the difference images that lack overlap with the rough defect areas of interest from the activation heatmaps.

11. A computer program product for image-based defect detection, the computer program product comprising a non-transitory computer readable storage medium having program instructions embodied therewith, the program instructions executable by a computer to cause the computer to perform a method comprising:

performing, by a processor device, template matching and subtraction on a set of training images and at least one template image to obtain a set of difference images, the difference images having defects, if any, highlighted therein;

generating, by the hardware processor applying a binary classification model to each of the training images in the set, activation heatmaps;

identifying, by the hardware processor, rough defect areas of interest in the activation heatmaps; and super-imposing, by the hardware processor, the activation heatmaps onto the difference images to obtain a set of super-imposed images, and highlight, as true defect areas, any areas in the super-imposed images having the defects from the difference images that overlap with the rough defect areas of interest from the activation heatmaps.

12. The computer program product of claim 11, wherein the set of training images include class-labels and lack location labels for any of the defects therein.

13. The computer program product of claim 11, wherein the method further comprises training a deep neural network for image segmentation using the set of training images.

14. The computer program product of claim 13, wherein the method further comprises:

applying an inspection image of an object to the trained binary classification model in order to identify a defect area in the object; and discarding the object responsive to identifying the defect area.

15. The computer program product of claim 11, wherein the method further comprises training a deep neural network for object detection using the set of training images.

16. The computer program product of claim 15, wherein the method further comprises:

applying an inspection image of an object to the trained binary classification model in order to identify the object; and automatically engaging one or more motor vehicle functions to avoid contacting the object.

17. The computer program product of claim 11, wherein each of the super-imposed images consist of a respective single image having six channels, with three channels supplied from each of the constituent images forming the respective single image.

18. The computer program product of claim 11, wherein the method further comprises screening out false defect areas in the difference images based on the heatmaps.

19. The computer program product of claim 11, wherein the false defect areas are detected in the difference images based on a lack of co-occurrence of a respective one of the rough defect areas of interest in a respective one of the heatmaps.

20. A computer processing system for image-based defect detection, comprising:

a memory for storing program code; and a processor device for running the program code to perform template matching and subtraction on a set of training images and at least one template image to obtain a set of difference images, the difference images having defects, if any, highlighted therein;

generate, by applying a binary classification model to each of the training images in the set, activation heatmaps;

identify rough defect areas of interest in the activation heatmaps; and super-imposing the activation heatmaps onto the difference images to obtain a set of super-imposed images, and highlight, as true defect areas, any areas in the super-imposed images having the defects from the difference images that overlap with the rough defect areas of interest from the activation heatmaps.

* * * * *